United States Patent [19]

Keeling

[11] 4,031,281

[45] June 21, 1977

[54] FLOCKED METALLIC LAMINATED WALLCOVERINGS

[75] Inventor: Ronald James Keeling, Cincinnati, Ohio

[73] Assignee: Formica Corporation, Stamford, Conn.

[22] Filed: Sept. 21, 1976

[21] Appl. No.: 725,053

Related U.S. Application Data

[63] Continuation-in-part of Ser. No. 619,094, Oct. 2, 1975, abandoned.

[52] U.S. Cl. .............................. 428/90; 156/279; 156/280; 156/285; 156/298; 156/333; 427/200; 427/206; 427/404; 427/407 R; 428/95; 428/172; 428/201; 428/248; 428/252; 428/340; 428/341; 428/342; 428/458; 428/480; 428/482; 428/483; 428/463; 428/507; 428/520; 428/522

[51] Int. Cl.$^2$ ..................... B32B 3/02; B32B 33/00

[58] Field of Search ................ 428/89, 90, 95, 172, 428/201, 248, 252, 264, 265, 272, 274, 340, 341, 342, 458, 463, 480, 482, 483, 507, 520, 522, 532; 427/197, 200, 206, 402, 404, 407, 412; 156/72, 279, 280, 285, 298, 333

[56] References Cited

UNITED STATES PATENTS 2,702,580  2/1955  Bateman ........................... 428/248

*Primary Examiner*—Marion E. McCamish
*Attorney, Agent, or Firm*—Frank M. Van Riet

[57] ABSTRACT

A wallcovering comprising a fabric-backed, lightweight laminate is disclosed wherein the fabric is coated with various pigmented polymer coatings to which is applied a film of metallized polyethylene terephthalate. The metallized film is then flocked. Printed designs may be applied thereto prior to the addition of the flock.

10 Claims, No Drawings

FLOCKED METALLIC LAMINATED WALLCOVERINGS

CROSS-REFERENCE TO RELATED APPLICATIONS

This application is a continuation-in-part of my copending application, Ser. No. 619,094, filed Oct. 2 1975, and entitled FLOCKED METALLIC LAMINATED WALLCOVERINGS, now abandoned.

BACKGROUND OF THE INVENTION

The production of fabric-backed wallcoverings has materially increased in recent years. The increase in volume is attributed to the ease of application of these wallcoverings to the wall as well as the ease in removal thereof. Additionally, fabric-backed wallcoverings have proven popular because they are easily cared for and maintained.

As the popularity of fabric-backed wallcoverings increased, so did the consumer's demand for more diverse patterns and variety. As a result, manufacturers have, more recently, attempted to produce wallcoverings having deeper and clearer color and in a variety of patterns. These newly introduced designs have also proven successful and wallcovering manufacturers are now attempting to develop even more attractive and durable products.

One product which has not proven to be easily produced is a metallic and flocked wallcovering. This difficulty of production is apparently due to the fact that conventional laminated wallcoverings do not have the thermal stability to allow the fusion of a plastisol flock adhesive thereto, which fusion requires a temperature of about 275° C. Attempts to fabricate such products have resulted in curling, wrinkling and delamination of the product within seconds after reaching this fusion temperature. Wallcoverings produced by adhesively bonding preformed films directly to the fabric backing, on the other hand, are more expensive because such films cannot be as heavily loaded with pigment as is required, because of conditions of their manufacture. Additionally, the adhesion lamination technique does not enable the film to be locked onto the fabric and delamination can occur.

SUMMARY

I have now discovered that thermally and dimensionally stable wallcoverings can be produced, which wallcoverings achieve the aesthetics of deep gloss, metallic reflectance and flock. They couple their pleasing, aesthetic decorative effect with ease of application, excellent durability, scrubability, stain-resistance and ease of removal.

Articles of manufacture related to those disclosed and claimed herein are set forth in U.S. Pat. No. 2,702,580. The instant wallcoverings, however, are superior to articles taught therein, as enumerated hereinbelow.

DESCRIPTION OF THE INVENTION INCLUDING PREFERRED EMBODIMENTS

As mentioned above, the instant invention resides in a thermally and dimensionally stable wallcovering and a process for the production thereof. The wallcoverings weighs from about 6.0 to about 11.8 ounces per square yard and comprises, in superimposed relationship, 1. a fabric material weighing from about 0.5 to about 1.4 ounces per square yard,
2. a calendered coating atop said fabric of a filled vinyl chloride/vinyl acetate copolymer, the coating weighing from about 2.5 to about 4.5 ounces per square yard,
3. a clear, adhesive coating, atop said calendered coating, of a vinyl chloride/vinyl acetate copolymer, the adhesive coating weighing from about 0.2 to about 0.4 ounces per square yard,
4. a film of polyethylene terephthalate having a metal surface on one side thereof with a heat-sensitive coating thereon, and a thermosetting polyester coating on the other side, with the heat-sensitive coating adjacent said adhesive,
5. a vinyl adhesive coating on said polyester coating and
6. flocking applied to said vinyl adhesive.

The above six components are all critical in producing the novel wallcoverings of the present invention; however, components (1) and (2) form the critical base without which the remaining components cannot be used. The coated fabric material is the key to this invention because the coating actually penetrates the fabric interstices and locks into the fiber, resulting in the required thermal and dimensional stability necessary to apply the metalized film thereto.

The substrate material comprises a woven or non-woven fabric of cotton or other cellulosic material or synthetic fibers such as polyesters of the above weight alone or in admixture with one another. Cotton-polyester materials should contain about 50% of each component. A suitable polyester is Dacron woven fabric possessing the weight requirements specified above usually has a thread count of from about 23–30 per inch in both the warp and fill direction. Mixtures of cotton thread and polyester thread can be used, one type of thread being used in the warp direction and the other in the fill direction. It is preferred that the warp direction thread always be pure cotton. The non-woven fabrics useful as substrates herein are generally composed of very long synthetic fibers laid down in a random fashion to produce a non-directional mat. The fiber intersections are secured by fusing or by application of an adhesive.

The material used to coat the fabric backing member is a heavily filled vinyl chloride/vinyl acetate copolymer. The vinyl acetate is used at from about 5% to about 15%, by weight, based on the total copolymer weight. It is applied to the fabric as an aqueous latex and can be filled with such materials as $TiO_2$, $ZnO_2$, $BaSO_4$, $CaCO_3$, clays, talcs, aluminum hydrates and the like in amounts ranging from about 50% to about 350%, by weight, based on the weight of the dry vinyl chloride copolymer. External plasticizers such as phthalates, expoxidized tall oils and the like may also be incorporated depending upon the desired flexibility of the finished product. Antifoaming agents, surfactants, thickeners etc, may also be included. The heavy mineral loading contributes to the thermal stability of the final product by reducing the thermoplastic character of the vinyl chloride copolymer coating. An optional top coating may be applied to the fabric coated with the filled vinyl chloride/vinyl acetate copolymer. This top coat is a second application of the above aqueous copolymer latex and again contains the filler but in proportions of filler to polymer of at least 2.5:1. It aids the first coating or "daub" and provides a more sturdy support for the other subsequently added wallcovering components. Other minor variations in this material can be made. The first latex coating is applied so as to result in the addition of 3.5–4.5 ounces per square yard when dry while the optional second latex coating is used in amounts so as to deposit 0.0–3.0, preferably 1.8–3.0 ounces per square yard to final wallcovering.

To the vinyl chloride/vinyl acetate copolymer layer or layers on the fabric is next applied a clear, vinyl chloride/vinly acetate copolymer adhesive. Suitable copolymers contain at least about 86% vinyl chloride, the remainder being vinyl acetate. Up to about 2.0% of the vinyl acetate can be replaced by a copolymerizable dibasic acid such as maleic acid, fumaric acid etc. It is applied very sparingly as a solvent solution by gravure printing and is used to increase bonding of the metalized terephthalate film to the first coating. Evaporation of the solvent results in the deposit of the clear adhesive film.

The polyethylene terephthalate film ranges in thickness from about 0.5 mil to about 5.0 mils and adds the bulk of the remaining weight to the wallcovering. It has a metal film on one of its surfaces, of which aluminum is preferred. Other metals such as copper etc. can be used. The metal film is thin and is applied onto the polyethylene terephthalate by vacuum deposition as is known in the art. The polyethylene terephthalate film is preferably biaxially oriented as is also known in the art. Atop the metal film there is coated a heat-sensitive adhesive layer. Any adhesive which conforms to this definitions may be used with such materials as 85–88% vinyl chloride, 11–14% vinyl acetate, 0.8–1.2% maleic acid terpolymers and the like being exemplary. On the surface of the terephthalate film opposite the metalized side is positioned an optically clear, thermosetting polyester coating which serves as the flock receptive layer. Examples of materials useful for the purpose include condensation products of glycols and dibasic acids having reactive side groups.

The polyethylene terephthalate film, as described above, containing said coatings, is applied to the coated fabric with the metalized side facing said fabric by heat and pressure.

A print design is then optionally, but preferably, applied to the polyester layer utilizing any conventional gravure printing equipment. The use of vinyl inks is preferred, however, any other type of ink which enables the design to be readily printed onto the polyester surface may be used such as acrylic gravure printing inks and the like.

An adhesive capable of retaining flock is then applied to the wallcovering. The flocking adhesive may be gravure printed or plastisol printed onto the surface and may, in some instances, cover some of the same area upon which the design is printed. This adhesive enables the flock to be securely attached to the wallcovering and ensures increased washability. Suitable adhesives include polyvinylchloride plastisols, various aqueous acrylics and the like. Of course, the flock can be applied to any part of the uppermost wall-coverin surface in order to achieve the particular decorative effect desired. It is preferred, however, that flock be applied to at least some of the area where the design has been printed. The adhesive can contain plasticizers, stabilizers, and can be applied from solvent solution. The flock fibers are preferably rayon, but other fiber-forming polymers such as polyacrylonitrile can also be used. Natural fibers are also useful.

The wallcoverings of the instant invention are prepared as follows. The fabric is first placed under tension and straightened by placing it on a suitable mechanical web handling and aligning device. The aqueous vinyl chloride/vinyl acetate copolymer latex is applied, preferably via the coating mechanism of the web handling device, in an amount sufficient to deposit the required weight of solids. The coated fabric is then passed through a suitable dryer such as an air circulating oven at about 325° C. in order to remove water from the coating. This procedure coalesces the composition and causes the formation of a film.

The resultant dry, coated fabic is then removed from the mechanical device, the edges of the material are trimmed and the second latex coat, if desired, is applied by using a suitable device such as an air knife. The thus coated fabric is then passed through another dryer such as an air circulating, hot air oven at 325° F. (as above) to dry the second coating. While still hot, i.e., at about 275° F., the thus coated web is fed between the crushing rollers of a calender stack of about 300 pounds per lineal inch pressure in order to obtain a smooth surface. Chilling of the smoothed material is then required to set the smooth surface.

The resultant material is next placed on a gravure printing machine and the vinyl chloride/vinyl acetate copolymer adhesive is applied to the smoothed, coated surface of the fabric. A tint of ½% carbon black is usually added to the adhesive in order to assure by visual detection that this adhesive remains on the fabric during subsequent treatment. The adhesive is deposited using any suitable cylinder such as a gravure cylinder having 55 l.p.i. quadrahelic etch at the required level and dried.

The adhesive coated product is then preheated by passing it around a heated drum (e.g., at about 320° F.) with the back uncoated portion of the fiber in contact with the drum. At a point about one-third around the circumference of the drum, the coated surface of the article is brought into contact with the metalized polyethylene terephthalate film, the coated face of the fiber being in contact with the heat-sensitive adhesive face of the metalized film. The two webs continue around the heated drum and are then fed between the smooth rollers of a laminating nip press. Web temperature is controlled at about 270° F. and the laminate is consolidated into a unitary structure at about 400 pli pressure on the chilled nip rollers. The metalized material is then cooled to ambient conditions and printed with the desired design using conventional gravure printing cyclinders and vinyl inks if desired. The printed design may form a background of a design different from that of the flock to be applied, an outline design or the same or an independent design. The vinyl adhesive is applied to the printed area in the same desired pattern at a subsequent station and the resultant web is then passed under a hopper where the flock is deposited. Orientation of the deposited flock is achieved by means of a beater bar, electrostatic charge etc. to thereby set up the flock. Excess flock is vacuumed off and the flock adhesive is fused at a temperature in excess of about 275° F. to bond the flock. Embossing of the web can be effected anytime in the process, but is preferably conducted after the metalized film is applied and before printing and flocking, by passing it through a conventional embossing apparatus.

The following examples are set forth for purposes of illustration only and are not to be construed as limitations on the present invention except as set forth in the appended claims. All parts and percentages are by weight unless otherwise specified.

EXAMPLE 1

A cotton sheeting fabric backing member, running about 8.7 yards per pound per 50 inch width, i.e., 1.2 ounces per square yard, and having a thread count of 30×30 is coated on one side with an aqueous pigmented vinyl latex, the member having been placed under tension and straightened by a mechanical coating and web aligning device. The vinyl latex has the following composition:

| A. | Coating Grind (70% solids) Material | Wt. Lbs. |
|---|---|---|
| | 1. Water | 28.20 |
| | 2. Tetra sodium pyrophosphate | .20 |
| | 3. $TiO_2$ slurry (67% solids) | 15.94 |
| | 4. Antifoam solution - 50% | .13 |
| | 5. $CaCO_3$ | 67.35 |
| | | 111.82 |
| B. | Final Coating Latex (58% solids) Material | Wt. Lbs. |
| | 1. Coating Grind (A), above | 55.91 |
| | 2. A commercially available vinyl chloride/vinyl acetate (90/10) copolymer latex (56.5% solids) | 53.03 |
| | 3. Water | 8.80 |
| | 4. *Thickener solution (12.5% solids) | .72 |
| | 5. *Water | .83 |
| | | 119.29 |

*Premix 4 and 5 before addition.

The latex is applied to the fiber so as to deposit 4.0 ounces thereof (solids) per square yard of fiber. The resultant coated fiber is passed through a 325° F. air circulating oven. Water is removed from the coating and the resultant film is thereby set.

The coated fabric is removed from the device and the edges are evenly trimmed. A second vinyl chloride/vinyl acetate copolymer latex is then applied via an air knife, depositing 2.8 ounces thereof per square yard dry. This second latex has the following composition:

| C. | Coating Grind (67% solids) | Wt. Lbs. |
|---|---|---|
| | 1. Water | 25.55 |
| | 2. $TiO_2$ slurry (67% solids) | 48.86 |
| | 3. Antifoam solution - 50% | .20 |
| | 4. $CaCO_3$ | 47.50 |
| | 5. Surfactant solution - 25% | .40 |
| | 6. Epoxidized tall oil plasticizer | 4.99 |
| | | 127.50 |
| D. | Final Coating Latex (58% solids) Material | Wt. Lbs. |
| | 1. Coating Grind C, above | 73.95 |
| | 2. Same vinyl chloride/vinyl acetate copolymer as B-2, above, (56.5% solids) | 27.83 |
| | 3. Water | 8.71 |
| | 4. Thickener (12.5% solids) | 2.60 |
| | | 113.09 |

The web is dried at 325° F. in an air circulating, hot air oven and while still at about 275° F. is fed between the crushing rollers of a calender at 300 p.l.i. pressure on the rollers. A smooth surface results. The surface is set by chilling the web to 20° F. The resultant web is rolled up and placed on a gravure printing machine. A coating comprise- a 20% solids solution of a vinyl chloride/vinyl acetate (86/14) copolymer dissolved in a 70/30 acetone/methyl ethyl ketone solvent mixture is prepared. Carbon black (0.5%) is added and the adhesive is deposited, using a gravure cylinder having a 55 l.p.i. quadrahelic etch, at about 0.3 ounce per square yard, as a dry uniform coating.

The resultant material is preheated by passing it around a drum heated to 320° F. with the cotton back in contact with the drum. At a point about one-third around the drum, the adhesive coated side is brought into contact with a clear, 0.5 mil biaxially oriented film of polyethylene terephthalate having on one side thereof a thin, vacuum deposited aluminum layer. The aluminum layer is coated with a heat-sensitive adhesive of a vinyl chloride/vinyl acetate/maleic acid (86/13/1) terpolymer. On the side of the terephthalate film opposite the aluminum layer is a 0.1 mil thick, clear coating of a polyester adhesive.

The adhesive coated surface of the coated fabric is brought into contact with the heat-sensitive adhesive face of the terephthalate film and the two webs continue around the heated drum and are then passed between the smooth rollers of a laminating nip press, the web temperature being controlled at 270° F. –310° F. The nip rolls are chilled to 20° F. and the two webs are laminated together under a 400 p.l.i. pressure. The resultant material is then immediately passed through additional cooling rollers to reduce it to ambient conditions. The resultant material has a highly lustrous, metallic finish of mirror-like appearance.

The polyester coated-aluminum side of the laminated article is then printed with a repeating stripped design using black vinyl ink and a conventional gravure printing cylinder and is dried. A commercially available vinyl adhesive is then applied to the areas of the surface having the black printed design thereon. The adhesive has the following composition:

| | | Parts |
|---|---|---|
| 1. | Powdered vinyl resin (GEON 124 or 128 - B.F. Goodrich Co.) | 100.00 |
| 2. | Epoxidized tall oil plasticizer | 30.00 |
| 3. | Isobutyrate solvent | 30.00 |
| 4. | Oil plasticizer | 3.00 |
| 5. | Organotin stabilizer | 0.75 |
| | | 163.75 |

The web is then passed under a hopper containing blue, short, rayon flock fibers which are deposited thereon. The fibers are oriented by means of a beater bar, the excess flock is vacuumed off and the adhesive is fused at 275° C. A wallcovering of excellent thermal and dimensional stability, deep gloss, metallic reflectance and scrubability is recovered. It is resistant to staining by crayon, fingermarks and oily grime.

EXAMPLE 2

The procedure of Example 1 is again followed except that the aluminum side of the laminated web is embossed before printing. An aesthetically pleasing wallcovering results.

EXAMPLE 3

The procedure of Example 1 is again followed except that the adhesive coating applied to the printed design is tinted light blue.

EXAMPLE 4

The procedure of Example 1 is again followed except that the black printed design is eliminated. Similar results are observed.

EXAMPLE 5 (COMPARATIVE)

The procedure set forth in Bateman U.S. Pat. No. 2,702,580 is carefully followed in an attempt to produce a wallcovering in accordance therewith. The procedure is as set forth in Example 1 thereof, Col. 1, line 76 to Col. 3, line 32, except as follows.

A. Due to difficulties in applying 0.5 ounce per square yard of the base coating composition with a 20% total solids solution, the percent solids was reduced to 10% by adding additional solvent.

B. The bone black particles employed were too large to give a smooth surfaced coating so the solution was milled, ball mill jar fashion, at a 2:1 mixture to media ratio, for 24 hours. A smooth solution resulted. Some air intrapment occurred in coating but no serious problems resulted. The solution was knife coated to 12 mils.

C. The aluminized film adhesive was a vinyl chloride/-vinyl acetate-maleic acid (86/13/1) terpolymer.

D. The cotton fabric had a thread count of 69 × 60 and weighted 3.9 ounces per square yard. This was the closest material commercially available to that set forth by the patentee.

Comparative results of the procedures of Batemen vs. that of Example 1, above are as follows:

1. APPEARANCE

Immediately after lamination of the terephthalate film, the material of Example 1 showed the characteristic telegraphing of the cotton fabric while the Bateman samples showed no telegraphing. None of the samples showed any signs of self-delamination upon storage at room temperature, nor when heated to 158° F. for 72 hours did any surface defects appear. Viewed from the fabric side, the material produced by the Bateman process showed that the base coat has oozed therethrough while the material of Example 1 of the instant application did not.

2. EMBOSSABILITY

The thermoplastic nature of the product shown by the Bateman patent produced samples showing a very high emboss factor, rendering the sample wrinkled and slightly distored. Embossments in the Example 1 material were excellent.

3. WASHABILITY

The washability test performed on the two samples was insufficiently severe to cause any cleavage of the bonding of the articles. After 3000 cylces, only light to moderate wear was evident on either sample.

4. STIFFNESS

Stiffness was tested by both the single and double cantilever methods, ASTM-D-1388-64. Both samples exhibited comparable stiffness. The sample of Example 1, above, however, "felt" stiffer, the product of the patent "feeling" like conditioned leather or rubber.

5. TENSILE STRENGTH

The greatest factor in determining the strength of the two samples was the inherent strength of the terephthalate film itself. Since this film was common to both samples, tensile testing was performed on samples that were prepared up to but not including the terephthalate layer.

As was expected, the patentee's uncoated fabric was stronger. It had a breaking strength of 52.5 lbs. for a 1 inch wide strip. The 30 × 30 uncoated fabric of Example 1, above, had a breaking strength of 10.6 pounds. When the Bateman fabric was coated by the Bateman process, it showed a very slight increase in strength and had a 6% increase in elongation. The coated fabric of the instant invention doublin strength, and was less elastic. See Table I, below.

TABLE I

| Fabric | Coating | Strength (Lbs.) | Elongation |
|---|---|---|---|
| 30 × 30 | None | 10.6 | 7.5% |
| 30 × 30 | Ex. 1 above | 21.7 | 5.1% |
| 30 × 30 | Bateman | 14.2 | 7.9% |
| 56 × 60 | None | 52.5 | 13.0% |
| 56 × 60 | Bateman | 52.6 | 19.2% |

The two samples were subjected to a hand scrub test wherein each sample was scrubbed for 200 cycles. The test was conducted by grasping the sample between the two hands so that the thumbs were on top of the sample, parallel to each other and one-half inch apart. The hands were then brought together and scrubbed as if washing a fabric (Automotive Industries, Dec. 20, 1973). The surface of the patentee's sample was badly wrinkled while that of Example 1, above, resisted surface wrinkling for a longer period of time.

EXAMPLES 5 & 6

The procedure of Example 1 is again followed except that the fabric is (5) a polyester material and (6) a 50/50 cotton-polyester material. Substantially analogous results are achieved in each instance.

EXAMPLES 7, 8 & 9

The procedure of Example 1 is again followed except that the fabric is (7) a non-woven spunbonded polyester material weighing 1.0 ounce per square yard, (8) a non-woven rayon material containing an acrylic latex binder and (9) a 70% polyester-30% natural cellulose non-woven mat weighing 1.0 ounce per square yard. Substantially analogous results are achieved in each instance.

I claim:

1. A thermally and dimensionally stable wallcovering, weighing from about 6.0 to about 11.8 ounces per square yard, comprising, in superimposed relationship,
   1. a woven or non-woven cellulosic or synthetic fabric weighing from about 0.5 to about 1.4 ounces per square yard,
   2. a calendered coating atop said fabric of a filled vinyl chloride/-vinyl acetate copolymer, said coating weighing from about 3.5 to about 4.5 ounces per square yard,
   3. a clear adhesive coating, atop said calendered coating, of a vinyl chloride/vinyl acetate copolymer, said adhesive coating weighing from about 0.2 to about 0.4 ounces per square yard,
   4. a film of clear polyethylene terephthalate, metalized on one side and having a heat-sensitive adhesive coating on said metal and a thin, clear thermosetting polyester coating on the other side thereof, said metalized side being in contact with said (3),
   5. a vinyl adhesive coated on said (4) and
   6. flocking applied to the area of said (5).

2. A wallcovering according to claim 1 wherein a calendered, heavily filled, vinyl chloride/vinyl acetate copolymer coating is positioned between said (2) and said (3).

3. A wallcovering according to claim 2 wherein the composite to which said (5) is applied, is embossed.

4. A wallcovering according to claim 2 wherein said clear polyester coating is pigmented or colored.

5. A wallcovering according to claim 1 wherein said clear polyester coating is pigmented or colored.

6. A wall covering according to claim 1 wherein the composite upon which said (5) is applied, is embossed.

7. A wallcovering according to claim 1 wherein a design is printed atop said clear polyester coating.

8. A method for the production of the wallcovering of claim 1 which comprises
- A. coating a woven or non-woven cellulosic or synthetic fabric weighing from about 0.5 to about 1.4 ounces per square yard with sufficient aqueous, filled vinyl chloride/vinly acetate copolymer latex so as to apply thereon, when dried, a coating weighing from about 3.5 to about 4.5 ounces per yard,
- B. drying the resultant coated fabric,
- C. calendering the resultant, dried, coated fabric,
- D. coating the resultant calendered, dried, coated fabric with sufficient vinyl chloride/vinyl acetate copolymer solution so as to apply thereon, when dry, an adhesive coating weighing from about 0.2 to about 0.4 ounces per square yard,
- E. drying said adhesive coating,
- F. adhering a film of clear polyethylene terephthalate which is metalized on one surface thereof and has a heat-sensitive adhesive coating on said metal and a thin, clear, thermosetting polyester coating on the other side thereof, to the dried, adhesive coating, the dried adhesive coating and the heat-sensitive adhesive being contiguous,
- G. coating the printed design with a vinyl adhesive and
- H. applying flock to said vinyl adhesive coating.

9. A method according to claim 8 including
- I. applying a heavily filled vinyl chloride/vinyl acetate copolymer coating to said calendered, dried, coated fabric and,
- J. calendering the resultant polyvinyl chloride coating.

10. A method according to claim 8 including printing a design on said clear polyester coating.

* * * * *